United States Patent
Aladas

(10) Patent No.: US 8,786,466 B1
(45) Date of Patent: Jul. 22, 2014

(54) WIRELESS PUSH BUTTON DEVICE FOR PEDESTRIAN CROSSWALK SIGNAL SYSTEM

(71) Applicant: Mohamad Motaz Aladas, Ottawa (CA)

(72) Inventor: Mohamad Motaz Aladas, Ottawa (CA)

( * ) Notice: Subject to any disclaimer, the term of this patent is extended or adjusted under 35 U.S.C. 154(b) by 0 days.

(21) Appl. No.: 14/206,192

(22) Filed: Mar. 12, 2014

(51) Int. Cl.
  *G08G 1/095* (2006.01)
  *G08G 1/005* (2006.01)
(52) U.S. Cl.
  CPC .................................... *G08G 1/005* (2013.01)
  USPC ........................... 340/944; 340/925; 340/906
(58) Field of Classification Search
  USPC ........................................................ 340/944
  See application file for complete search history.

(56) References Cited

U.S. PATENT DOCUMENTS

| | | | |
|---|---|---|---|
| 2011/0140924 A1* | 6/2011 | Sennett et al. | 340/944 |
| 2012/0223843 A1* | 9/2012 | Wall et al. | 340/944 |
| 2013/0002452 A1* | 1/2013 | Lauren | 340/944 |

\* cited by examiner

*Primary Examiner* — Kerri McNally

(57) ABSTRACT

A wireless push button device and a method for wireless registration of request for activation of a desired pedestrian crosswalk signal system on an existing traffic signal pole comprising of a remote control and a receiver assembly wherein said remote control sends wireless signal to receiver assembly in order to register request for activating a pedestrian crosswalk signal system from a distance and the receiver assembly compares the received signal with that of stored values and sends back random signal for invalid signal, sends back encrypted signal for valid signal and walk signal OFF state and special signal for valid angle and walk signal ON state to the remote control whereby said remote control confirms activation of the pedestrian crosswalk signal system to an user by activating said LED, vibrator/buzzer and also confirms the user when it is safe to use crosswalk by turning on said LED and said vibrator/buzzer.

30 Claims, 3 Drawing Sheets

WIRELESS PUSH BUTTON DEVICE FOR PEDESTRIAN CROSSWALK SIGNAL SYSTEM

FIELD OF THE INVENTION

The present invention generally relates to traffic control systems. More particularly, the present invention is related to a pedestrian wireless traffic control push button.

BACKGROUND OF THE INVENTION

In urban and suburban streets pedestrian traffic as well as automobile traffic makes use of intersections. As pedestrians travel from one location to another, they are inevitably faced with walking across a street. At many traffic intersections which are provided with traffic lights, there is located a pedestrian operated push button switch on the traffic signal pole by means of which a pedestrian can activate the pedestrian crosswalk system to allow the pedestrian to walk safely across the street. However, in certain traffic intersections there is no provision of pedestrian operated push button switch on the traffic signal pole because the walk signal comes all the times whether there is a call or not at a definite interval. In the current situation, where pedestrian operated push button switch on the traffic signal pole exists, a pedestrian desiring to traverse the street, presses a push button on the traffic signal pole and the traffic controller registers the pedestrian call. At defined time in the traffic signal cycle, the traffic controller checks if there is a registered pedestrian call, if there is one, the cross-walk lighting is activated for certain time in the traffic signal cycle providing sufficient period of time to allow persons to cross. However, in the existing systems a pedestrian needs to walk to the traffic signal pole in order to press the push button. If this action happened just after the traffic controller checked for register pedestrian call, it will be too late for the current cycle and the pedestrian will have to wait for the next cycle to cross. Hence, in this process of walking to the traffic signal pole to press the pedestrian push button a pedestrian may miss a cycle and then he/she has to wait for the next cycle to cross the road.

In the present situation, when bicyclists want to cross a street, they need to get down from the bicycle and go to the traffic signal pole in order to press the pole push button. While doing this, a bicyclist might miss a crosswalk traffic controller check for call in the signal cycle and as a result have to wait for the next signal cycle in order to cross the street. This results in wastage of time in addition to the inconvenience to put down the bicycle to get to the traffic pole in order to push the button.

There have been few aids developed to indicate a visually impaired person when the way is clear to cross streets. In some cases, pedestrian signal lights at pedestrian crossings are combined with a sound signal which can indicate to a blind person when the way is clear to cross. Such systems, however, require manual triggering of the push button on the traffic signal pole for which a visually impaired person will have to go to the traffic signal pole. In case of wheelchair bound people also similar difficulty arises. In some case there isn't physical room available for wheelchair to park safely next to the pole to push the pedestrian button.

Thus, there is a need for a system which enables a person to register a request for activation of the crosswalk signal system from a distance without going near the traffic signal pole where the pedestrian push button is located.

A prior art search revealed that there are lots of systems and devices related to crosswalk signal systems and prior attempts to provide a suitable street crossing aid for the visually impaired and hearing impaired have been made but none reveals a device which aids in wireless triggering of the pole pedestrian bush button.

Consequently, there exists in the art a long-felt need for a wireless push button device for pedestrian crosswalk signal system for general pedestrians, cyclists, visually impaired pedestrians, hearing impaired pedestrians and also for wheelchair bound persons which provides users the control to register a request for activation of the pedestrian crosswalk signal system from a safe distance with the help of a remote control device without going to the traffic signal pole for manually pressing the pedestrian push button. There also exists in the art a long-felt need for a wireless push button device for pedestrian crosswalk signal system for general pedestrians, cyclists, visually impaired pedestrians, hearing impaired pedestrians and also for wheelchair bound persons which can be readily adapted to the existing traffic signal control systems. There also exists in the art a long-felt need for a wireless push button device for pedestrian crosswalk signal system for general pedestrians, cyclists, visually impaired pedestrians, hearing impaired pedestrians and also for wheelchair bound persons which can provide a visual, audible and/or tactile signal which will indicate when the request for activation of the desired crosswalk signal system gets registered and also when it is safe to cross, i.e., when the walk interval occurs. Additionally, there also exists in the art a long-felt need for a wireless push button device for pedestrian crosswalk signal system for visually impaired pedestrians where there is no provision of pedestrian push button which gives audible and tactile confirmation as to when it is safe to cross the street, i.e., when the walk interval occurs. Finally, there is a long felt need in the art for a wireless push button device for pedestrian crosswalk signal system for general pedestrians, cyclists, visually impaired pedestrians, hearing impaired pedestrians and also for wheelchair bound persons that accomplishes all of the forgoing objectives and that is relatively inexpensive to manufacture, install, safe and easy to use and is extremely useful to be included in the traffic signal systems at major intersections in urban and suburban streets.

OBJECTS OF THE INVENTION

An object of the invention is to provide a wireless push button device for pedestrian crosswalk signal system for general pedestrians, cyclists, visually impaired pedestrians, hearing impaired pedestrians and for wheelchair bound persons which can be readily adapted to the existing traffic signal technology.

Another object of the invention is to provide a wireless push button device for pedestrian crosswalk signal system which does not require manual triggering of the traffic signal pole push button unlike prior art systems.

A still another object of the invention is to provide a wireless push button device for pedestrian crosswalk signal system which does not require general pedestrians, cyclists, visually impaired pedestrians and wheelchair bound persons to go to the traffic signal pole in order to press the push button so as to register request for activation of the pedestrian crosswalk signal.

Yet another object of the present invention is to provide a wireless push button device for pedestrian crosswalk signal system which is activated by a remote control.

A further object of the present invention is to provide a wireless push button device for pedestrian crosswalk signal system which provides visual, audible and/or tactile confirmation when the request for activation of the desired crosswalk signal system gets registered.

A still further object of the present invention is to provide a wireless push button device for pedestrian crosswalk signal system which provides visual, audible and/or tactile signal to the user of the present invention as to when it is safe to cross the street, i.e., when the walk interval occurs.

A still another object of the invention is to provide a wireless push button device for pedestrian crosswalk signal system which activates the already existing audible sound system installed at the traffic signal pole to indicate as to when it is safe to cross, i.e., when the walk interval occurs.

Yet another object of the present invention is to provide a wireless push button device for pedestrian crosswalk signal system which facilitates visually impaired pedestrians where there is no audible sound system installed at the traffic signal pole by giving audible and tactile confirmation as to when it is safe to cross the street, i.e., when the walk interval occurs.

A further object of the present invention is to provide a wireless push button device for pedestrian crosswalk signal system which facilitates visually impaired pedestrians where there is no provision of pedestrian push button by giving audible and tactile confirmation as to when it is safe to cross the street, i.e., when the walk interval occurs.

A still further object of the present invention is to provide a wireless push button device for pedestrian crosswalk signal system which helps the user to maintain hygiene by avoiding the need to touch the traffic signal pole push button.

A still another object of the present invention is to provide a wireless push button device for pedestrian crosswalk signal system which saves time of the user.

Yet another object of the invention is to provide a wireless push button device for pedestrian crosswalk signal system which is inexpensive to manufacture, easy to install and use.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention cooperates with the existing traffic signal systems to provide a wireless device to initiate the activation of the pedestrian crosswalk signal system and to confirm it through visual, audible and/or tactile signal. Another embodiment of the present invention provides visual, audible or tactile signal to the user as to when it is safe to cross the street, i.e., when the walk interval occurs. In another preferred embodiment of the present invention the request for activating the existing audible signal system in the traffic signal pole can be registered from a distance. The preferred embodiment of the disclosed invention includes a remote control and a receiver assembly. The receiver assembly is mounted on an existing frame of a traffic signal pole. Preferably, the remote control has a button which when pressed sends information to the receiver. The remote control and the receiver assembly are the working components of the present invention. Preferably, the receiver assembly includes a receiver circuit in the traffic signal pole where the manual push button is located, or in the pedestrian signal head. The receiver receives the information from the remote control and it connects the right push button, as if the actual push button on the traffic signal pole is pressed.

Preferably, the remote provides visual, audible and/or tactile signal to confirm the user about the activation of the pedestrian crosswalk signal system and as to when it is safe to cross the street. There may be different types of audible, and/or tactile alerts provided to accommodate different impairments. For visually impaired pedestrians, audible and/or tactile alerts may be provided. For hearing-impaired pedestrians, visual and/or tactile alerts may be provided. For wheelchair bound persons, one or more of visual, audible and tactile alerts may be provided.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

Figure 1:
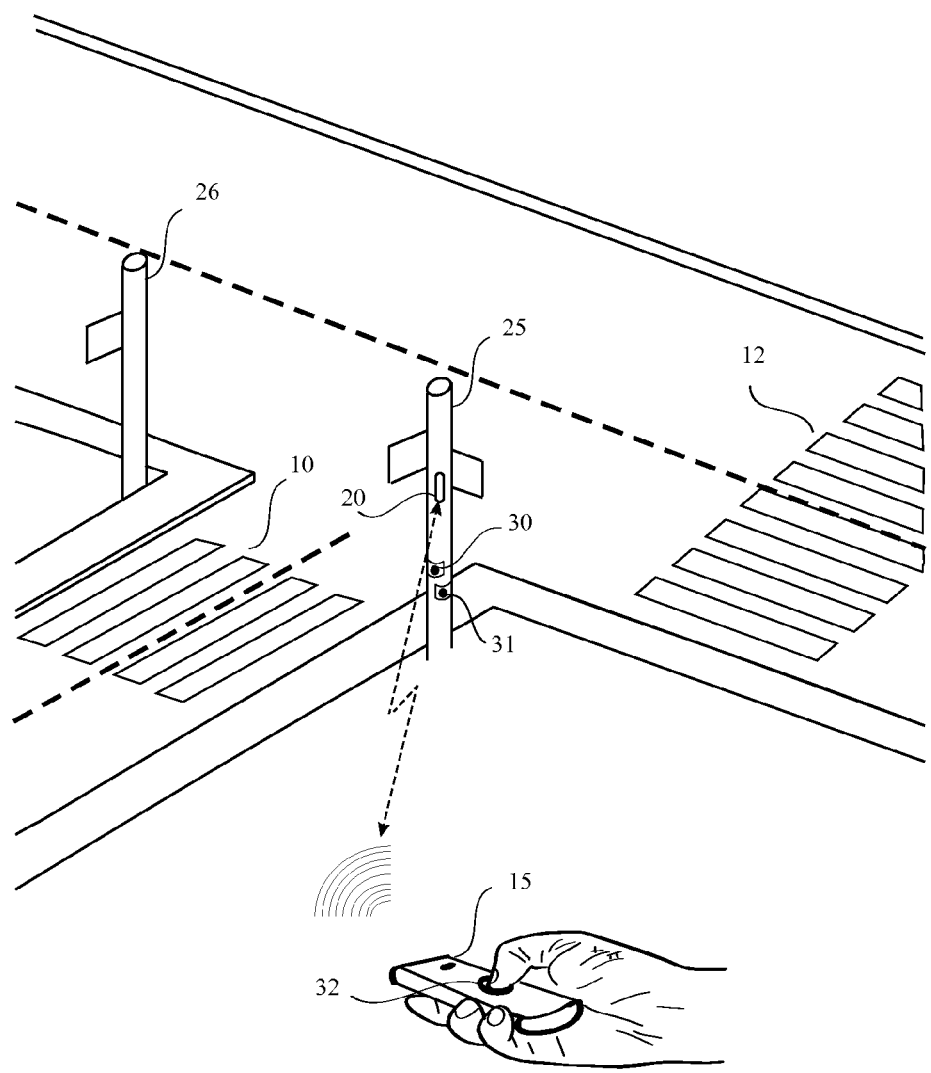
FIG. 1 illustrates an environment in which a pedestrian crosswalk signal system and a wireless device may be implemented according to an exemplary embodiment of the present invention.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The invention is now described with reference to the drawings, wherein like reference numerals are used to refer to like elements throughout. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention. In the following description, for purpose of explanation, numerous specific details are set forth in order to provide a thorough understanding thereof. It may be evident, however, that the invention can be practiced without these specific details.

The wireless push button device for pedestrian crosswalk signal system of the present invention is for general pedestrians, cyclists, visually impaired pedestrians, hearing impaired pedestrians and also for wheelchair bound persons. In the following description of the present invention the word "user" is used to represent any general pedestrian, cyclist, visually impaired pedestrian, hearing impaired pedestrian and wheelchair bound person using the present invention. The wireless push button device for pedestrian crosswalk signal system of the present invention provides users the control to activate the pedestrian crosswalk signal system from a distance with the help of a remote control device without going to the traffic signal pole for manually pressing the pedestrian push button. The distance within which the remote control system would work can be easily configured during installation of the receiver assembly of the system to suit the geometry of the road intersection. The present invention can be readily adapted to the existing traffic signal control systems. The wireless push button device for pedestrian crosswalk signal system of the present invention also provides a visual, audible and/or tactile signal which indicates when the request for activation of the desired crosswalk signal system gets registered and also when it is safe to cross, i.e., when the walk interval occurs in the desirable direction. The present invention also offers user the additional facility to register request in the traffic signal system for activating the audible pedestrian signal system from a distance provided the traffic signal system includes such audible pedestrian signal system. The present invention also facilitates visually impaired pedestrians where there is no audible sound system installed at the traffic signal pole by giving audible and tactile confirmation as to when it is safe to cross the street, i.e., when the walk interval occurs. The present invention offers further additional facility to visually impaired pedestrians where there is no provision of pedestrian push button by giving audible and/or tactile confirmation as to when it is safe to cross the street, i.e., when the walk interval occurs. Finally, the wireless push button device for pedestrian crosswalk signal system of the present invention is relatively inexpensive to manufacture, install, safe and easy to use and is extremely useful to be included in the traffic signal systems at major intersections in urban and suburban streets.

FIG. 1 illustrates an environment in which a pedestrian crosswalk signal system and a wireless device may be implemented according to an exemplary embodiment of the present invention whose principal components are a remote control 15 and a receiver assembly 20. The remote control 15 is with the user. The remote control 15 includes a remote push button 32. The remote control 15 can be held in the hand or can be kept in pocket or can be carried in a small hand bag. The receiver assembly 20 is installed on a traffic signal pole 25. The traffic signal pole 25 also include a pedestrian pole push button 30 for direction of one crosswalk 10 and a second pedestrian pole push button 31 for the other crosswalk direction 12 in a conventional manner for the pedestrian to activate the crosswalk signal. Another traffic signal pole 26 is also shown on the other side of the crosswalk 10.

Figure 2:
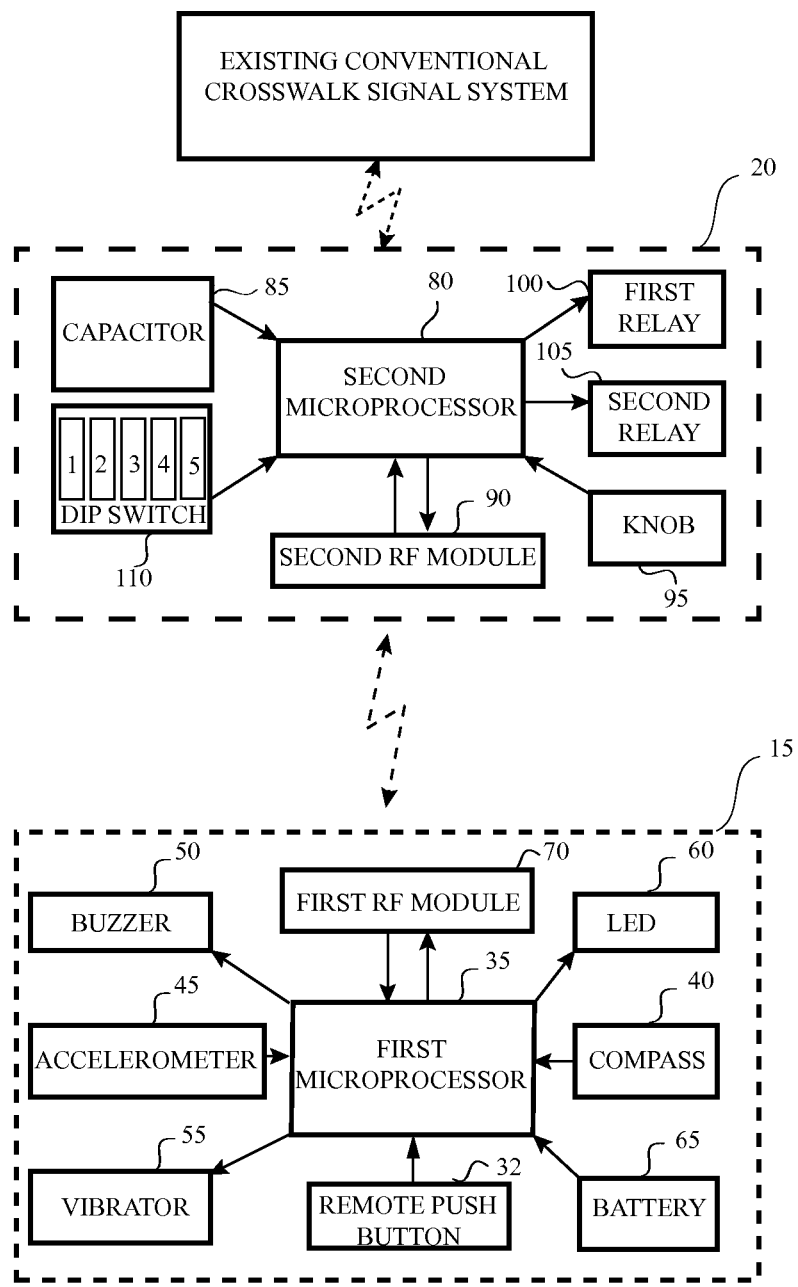
FIG. 2 illustrates the major components of the present invention in detail according to an exemplary embodiment.

As best illustrated in FIG. 2, the remote control 15 further comprises of a first micro-processor 35, a compass 40, an accelerometer 45, a buzzer 50, a vibrator 55, a Light Emitting Diode (LED) 60, henceforth will be referred to as LED, a battery 65, a first Radio Frequency (RF) Module 70, henceforth will be referred to as first RF Module, and a remote push button 32. The case of the remote control 15 can be manufactured from any suitable material known in the art, and is ergonomically designed to accommodate the grip of any user. The remote control 15 can also be manufactured in a variety of sizes, colors, styles and designs to accommodate user preferences.

As best illustrated in FIG. 2, the receiver assembly 20 further comprises of a second micro-processor 80, a capacitor 85, a second radio frequency module 90, henceforth will be referred to as second RF module, a knob 95, a first relay 100 and a second relay 105, a Dual Inline Package (DIP) Switch 110, henceforth will be referred to as DIP Switch. The case or box of the receiver control 20 can be manufactured from any suitable material known in the art and can also be manufactured in a variety of sizes, colors, styles and designs.

Figure 3:
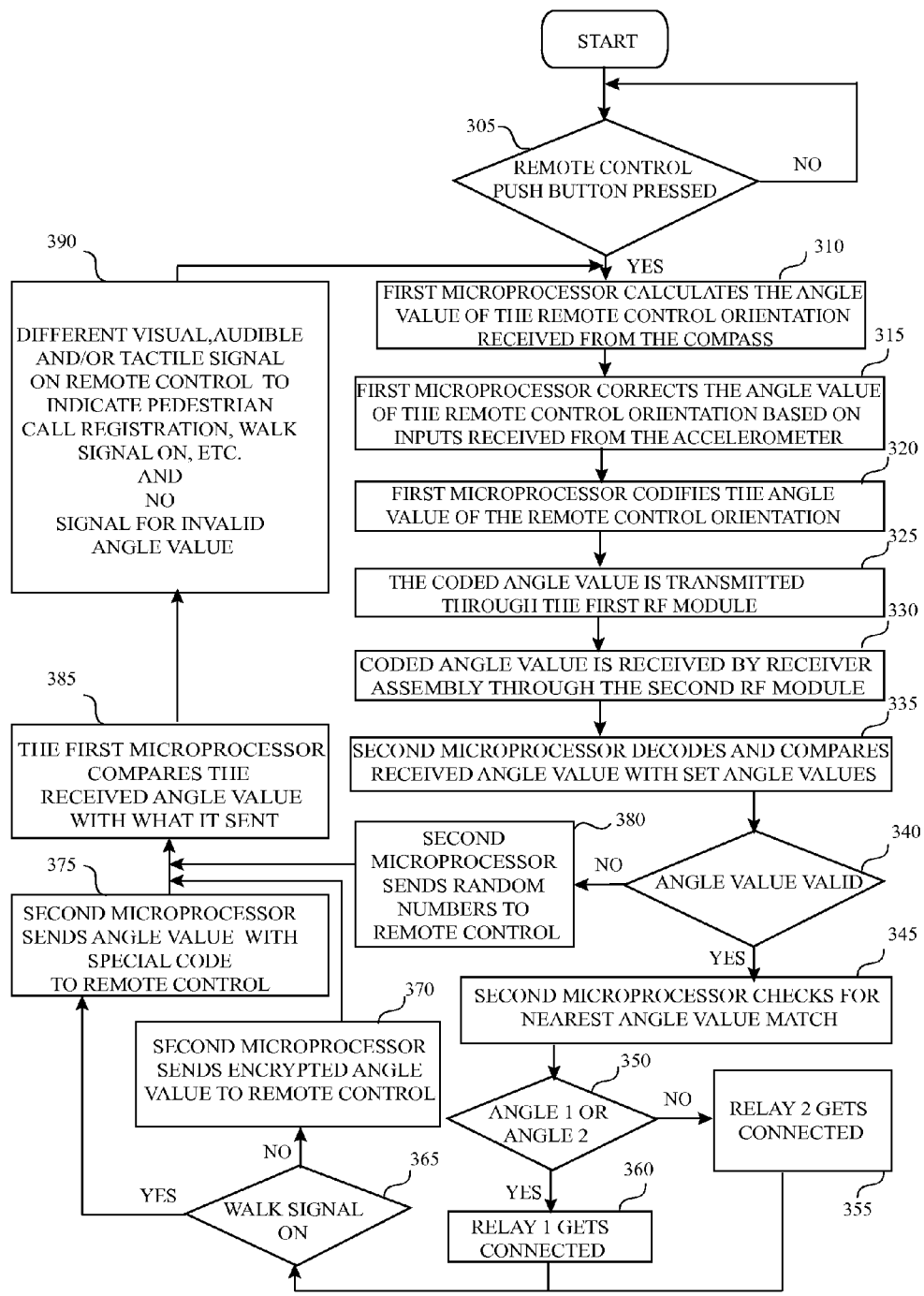
FIG. 3 shows a flow chart in detail according to an exemplary embodiment of the present invention.

Referring to FIGS. 1, 2 and 3, the wireless push button device for pedestrian crosswalk signal system combines the functions of remote control 15 to the receiver assembly 20, effecting communication between the remote control 15 and the receiver assembly 20. When a user wants to cross the street, in conventional scenario he/she must push either the pole push button 30 or the pole push button 31 as per the desired crosswalk direction on the traffic signal pole 25. In a preferred embodiment of the present invention, when a user wants to cross the street, as he/she approaches a traffic intersection the user uses the remote control 15 to activate the pedestrian crosswalk traffic signal system for the desired walk direction. The activation will be just like as if the pole push button 30 or 31 is pressed manually. The user of the present invention would get an indication on the remote control 15 when a call for pedestrian crosswalk signal in the desired direction is successfully registered. Additionally, at the time of pressing down the push button 32 the user would get an visual, audible and/or tactile indication on the remote control 15 if the walk signal in the desired direction is happened to be ON in that particular moment.

Some conventional traffic signal system may include audible pedestrian signal mounted on the traffic signal pole. This audible pedestrian signal is particularly helpful for the visually impaired pedestrians and the request for activation of the audible signal system can be registered by pushing down the pedestrian push button 30 or 31 and holding it for few seconds in the conventional system. In few jurisdictions the audible comes on every time i.e. they don't require holding the button for certain time. In case of the present invention, the same function of registering a pedestrian call and also for registering request for activating the pedestrian audible signal system can be achieved from a distance when the user of the present invention presses the remote push button 32 and holds the button down for few seconds pointing the remote control 15 in the desired direction of the crosswalk.

Unlike prior art systems, in the present invention a pedestrian doesn't need to walk to the traffic signal pole 25, doesn't need to manually trigger the pole push button 30 or 31 on the traffic signal pole 25 in order to register request for activation of pedestrian crosswalk traffic signal.

Further, it should be appreciated that, although only one remote control device, one receiver assembly, two traffic light signal poles, two pedestrian pole push buttons and two crosswalks are illustrated for simplicity of illustration, this disclosure may be applicable to any number of remote control devices, receiver assemblies, traffic light signal poles, pedestrian pole push buttons and crosswalks. The present invention can be easily adapted to traffic intersections even where no pedestrian push button system is installed.

Every traffic intersection is different in terms of presence of number of crosswalks, direction of crosswalks and size of the intersection etc. Therefore, in a preferred embodiment of the present invention, at the time of installation of the receiver assembly 20 in a traffic signal pole, or at any time thereafter, the receiver assembly 20 is configured to suit the need of the traffic intersection. The DIP switch 110 preferably consists of five numbers of switches (switch 1, 2, 3, 4 and 5). If any of the Dip switch is turned on, the receiver assembly 20 switches to configuration mode. In a preferred embodiment of the present invention, during configuration of angle/direction for a crosswalk, for a particular traffic intersection, switch 1 of DIP switch 110 of receiver assembly 20 is turned ON and the remote control 15 is pointed to the desired direction with the remote push button 32 pressed down. For example, as illustrated in FIGS. 1 and 2, turning on switch 1 of DIP switch 110 ON, the remote control 15 is pointed towards traffic signal pole 26 of crosswalk 10 and remote control push button 32 is pressed. In this process, the receiver assembly 20 records the angle of the crosswalk 10 in that direction, say angle 1 which is 5 degree north. The switch 1 of DIP switch 110 is turned OFF and switch 2 of DIP switch 110 is turned ON. The remote control 15 is then pointed towards the opposite direction of crosswalk 10 i.e. in the direction from traffic signal pole 26 to traffic signal pole 25 and remote push button 32 is pressed down. Turn switch 2 of DIP switch 110 OFF. This results in recording of the angle value, say angle 2, of the crosswalk 10 in the opposite direction. By following the same procedure, i.e. by turning ON and OFF the switches 3 and 4 of DIP switch 110, and pointing the remote control 15 in both the direction for crosswalk 12, one-by-one, the angle values, say angle 3 and angle 4, are recorded in the receiver assembly 20 for crosswalk direction 12. This is how crosswalk angle/direction configuration for the present invention is done for a particular traffic intersection. The present invention is then configured for the desired signal strength, i.e. the range of the zone from the receiver assembly 20 within which the remote control 15 can interact with the receiver assembly 20. This is achieved by turning ON switch 5 of DIP switch 110 and putting the knob 95 in the desired signal strength setting whereby the analog value against the selection of signal strength by the knob 95 gets stored in the receiver assembly 20. This completes the configuration of the present invention for a particular traffic intersection where it is to be installed. Although, in this description, the present invention is described for a traffic intersection having only two crosswalks, i.e. crosswalk 10 and crosswalk 12, it is to be understood that, the present invention can be applied to any type of traffic intersections.

As illustrated in FIGS. 1, 2 and 3, in a preferred embodiment of the present invention, when a user points the remote control 15 to the direction parallel to the direction from traffic pole 25 to traffic pole 26 from the direction of traffic pole 25 of crosswalk 10 which he wants to use, and, presses the remote push button 32 as in step 305, the first microprocessor 35 present in the remote control 15 calculates the angle value, say 13 degree north, for the remote control 15 orientation from the angle value received from the compass 40 as in step 310. Any erroneous angle given by the compass 40 resulting from the tilt of the remote control 15 is corrected by the first microprocessor 35 based on the inputs received from the accelerometer 45 as in step 315. The calculated angle value is coded by the first microprocessor 35 as in step 320. The coded angle value (13 degree north in the present example) is then transmitted through the first RF Module 70 as in step 325.

In a preferred embodiment of the present invention, the angle value of the remote control 15 orientation transmitted through the first RF Module 70 is received by the second RF Module 70 of the receiver assembly 20 installed at the traffic signal pole as in step 330. The second microprocessor 80 is programmed to assign a range of angle values (say plus/minus 10 degrees in this example) to the stored angle values 1, 2, 3, 4 etc. which would be acceptable for each crosswalk angle/direction. This range of acceptable angle value is provided to facilitate ease of use to the user in case the remote control 15 is not pointing perfectly parallel to the desired crosswalk direction. The second microprocessor 80 of the receiver assembly 20 decodes and compares whether the received angle value falls within the assigned range of angle values which have been stored in the receiver assembly 20 during configuration of the present invention at the time of installation at a traffic intersection as in step 335. In the present example, the angle value of 13 degree north is compared with the crosswalk angle/direction angle 1, angle 2, angle 3 and angle 4 which have been stored in the receiver assembly 20 during the angle/direction configuration of the present invention at the time of installation of the receiver assembly 20 as explained above. Based on calculations, the second microprocessor 80 determines the validity of the received angle value as in step 340. In the present example, as in step 345, when the second microprocessor 80 compares received angle value 13 degree north with the stored angle values 1, 2, 3 and angle 4, it finds that, received angle value 13 degree north, being within the acceptable range for angle value 1 (angle value 1 for this example is 5 degree north and, as such, with 10 plus/minus allowance, the acceptable range for crosswalk 10 becomes plus 15 degree north to minus 5 degree north) is the nearest valid match for crosswalk 10 direction. The second microprocessor then connects the appropriate relay for a certain period of time (say for 1.2 seconds) in the receiver assembly 20 as per match for the received angle value with stored angle values as in step 350.

In a preferred embodiment of the present invention, first relay 100 is activated when a valid angle value is received by the receiver assembly 20 for one crosswalk direction and the second relay 105 is activated when the receiver assembly 20 receives valid angle value from the remote control 15 for the other crosswalk direction. In the present example, the stored angle values 1 and 2 are for crosswalk 10 in either direction. Similarly, the stored angle values 3 and 4 are for crosswalk 12 in either direction. Therefore, since crosswalk signal system timing is same from both the ends of a crosswalk, be it stored angle 1 or stored angle 2, activation of a single relay is sufficient to register a request at the existing traffic signal system from either direction of the crosswalk as in step 355 and step 360.

If the received angle value is found to be not falling within any range of angle values for the stored crosswalk angle values, the second microprocessor then sends some random numbers to the remote control 15 as in step 380.

In a preferred embodiment of the present invention, as illustrated in FIGS. 1, 2 and 3, the second microprocessor 80 then checks if the pedestrian WALK signal is ON at the time of pressing down the remote push button 32 as in step 365. In case, the WALK signal is found to be ON at that moment, then the second microprocessor 80 sends back the received angle value with a special encrypted code to the remote control 15 as in step 375. On the other hand, if DONOT WALK signal is found ON at that moment, then the second microprocessor sends the angle value back encrypted to the remote control 15 as in step 370. The first microprocessor 35 of the remote control 15 then compares the received angle value with what it sent as in step 385. The first microprocessor 35 then activates different visual, audible and/or tactile indication to the user of the present invention according to the status of the request sent as in step 390. In the event of a failed request for registration of a pedestrian call at the traffic signal system, the remote control 15 would not activate the visual, audible and/or tactile indications. If the WALK signal is found to be OFF, then, on comparing the received encrypted angle value with the sent angle value, the first microprocessor 35 would activate the visual, audible and/or tactile indications preferably for a fraction of a second (say for 0.3 seconds) and then turn off the indications preferably for a greater fraction of a second (say for 0.7 seconds). This would ensure that, when the remote push button 32 is pressed down and a request for registering a pedestrian call is successfully registered but the WALK signal if OFF, then the user of the present invention would get a flashing of the LED 60 and intermittent indications from buzzer 50 and vibrator 55. In another preferred embodiment of the present invention, when first microprocessor 35 receives the angle value with special code for WALK signal ON, then the LED, buzzer 50 and vibrator 55 are activated preferably for less than a second (say 300 milliseconds). In this scenario, when the WALK signal is ON, if the remote push button 32 is kept pressed down then the steps mentioned above from 310 to 390 gets repeated. Due to the very fast rate at which these steps get repeated, to the user it would appear that the visual, audible and/or tactile indications are continuously on. This feature of the present invention is particularly helpful for the visually impaired pedestrians at traffic intersections where there is no audible pedestrian signal installed, as, by keeping the remote push button 32 pressed the user of the present invention can use the crosswalk when the WALK signal is ON, and, during that time, if the pedestrian signal comes to FLASH mode or DONOT WALK mode, then he/she can come to know about it as the buzzer/vibrator of the remote control 15 would stop the continuous buzzing or tactile indication and, instead will start giving intermittent indications just like the previous step.

In another preferred embodiment of the present invention, the timeout contact period (say 1.2 seconds) of the first relay 100 and second relay 105 is such that, when consecutive valid angles are received by the receiver assembly 20, the applicable relay remains ON. Therefore, if the remote push button 32 is pressed and is hold down for few seconds, the relay timeout of the receiver assembly 20 accordingly increases. This function ensures that, if there is an audible pedestrian signal installed at a traffic intersection, then this audible signal system can be activated in the same way by means of the present invention as can be done through pressing on the pole pedestrian push button 30 or 31 of the conventional systems.

The first microprocessor 35 is programmed to operate the functions of the remote control 15, including but not limiting to the following functions: controlling effective wireless communication between the remote control 15 and the receiver assembly 20, controlling the duration of glow of LED 60, duration of vibration of vibrator 55 or activation of buzzer 50, interfacing with the first RF Module 70 and second RF Module 90.

Battery 65 provides operating power to the powered components of the remote control 15 including the first microprocessor 35, the buzzer 50, the vibrator 55, the LED 60, the first RF Module 70 and the remote push button 32 and any other circuitry associated with the remote control 15. Thus the entire remote control is effectively powered by battery 65. The LED 60 changes color if battery is low.

In a preferred embodiment of the present invention, the power for the receiver assembly 20 is sourced from the power lines of existing pedestrian crosswalk signal lights. Preferably, a capacitor 85 is installed to ensure uninterrupted power supply to the receiver assembly 20. The capacitor 85 gets the power from the pedestrian Walk signal as well as from the pedestrian Don't Walk signal depending on whichever is active in a particular moment. During the time of power input interruption to the capacitor 85, i.e. during changeover of the pedestrian signal from Walk to Don't Walk and vice-versa and also during flashing of the Don't Walk signal, the capacitor 85 ensures that power supply to the receiver assembly 20 is uninterrupted thereby keeping the receiver assembly 20 alive all the time.

The receiver assembly 20 can read when the Walk/Do Not Walk signal is on in a certain crosswalk direction as the receiver assembly has connection to the Walk signal for that direction. The Walk signal of the other crosswalk direction is also connected to the receiver assembly 20 so that the present invention can indicate to the user of the remote control 15 if a Walk signal in a desired direction is on when the remote push button 32 is pressed pointing the remote control 15 in the desired direction.

It may however be noted that, although, in the foregoing description, the remote control 15 and receiver assembly 20 interact with each other through transmission of signal in simple form for some cases, in encrypted form in some other cases, with special codes in some cases and with random numbers in some other cases, the present invention can be practiced by adopting any of such forms of signal transmission for any of the relevant conditions.

In another preferred embodiment, if there is plurality of traffic signal poles, then the receiver assembly would be mounted on any of the poles. The receiver will get the power from one crosswalk signal only but it would remain connected to the power lines of the pedestrian walk signals of the other traffic signal poles also.

In another preferred embodiment of the present invention, Bluetooth devices or any other suitable devices known in the art are used for transmission of radio signals.

The RF modules used are approved by FCC and Industry Canada.

Additionally, other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wireless push button device for pedestrian crosswalk signal system comprising:
   a remote control having at least one first micro-processor, at least one compass, at least one accelerometer, at least one buzzer, at least one vibrator, at least one Light Emitting Diode (LED), at least one battery, at least one remote push button and at least one first Radio Frequency (RF) Module, said remote control adapted to transmit and receive wireless signals; and
   at least one receiver assembly having at least one second micro-processor, at least one capacitor, at least one first relay, at least one second relay, at least one DIP switch, at least one second RF module and at least one analog knob, said receiver assembly adapted to transmit and receive wireless signals and mounted at any position in a traffic signal pole;
   wherein said remote control and said receiver assembly interact with each other to request and register activation of said pedestrian crosswalk signal system and to provide indication on said remote control about the status of said pedestrian signal system to a user.

2. The wireless push button device for pedestrian crosswalk signal system as in claim 1, wherein said user is a general pedestrian, a cyclist, a visually impaired pedestrian, a hearing impaired pedestrian or a wheelchair bound person.

3. The wireless push button device for pedestrian crosswalk signal system as in claim 1, wherein said wireless push button device requests activation of an already existing audible sound system installed at said traffic signal pole to indicate as to when it is safe to cross a street.

4. The wireless push button device for pedestrian crosswalk signal system as in claim 2, wherein said wireless push button device facilitates said visually impaired pedestrian where there is no audible sound system installed at said traffic signal pole by giving audible and tactile confirmation as to when it is safe to cross a street.

5. The wireless push button device for pedestrian crosswalk signal system as in claim 2, wherein said wireless push button device facilitates said visually impaired pedestrian where there is no provision of pedestrian push button by giving audible and tactile confirmation as to when it is safe to cross the a street.

6. The wireless push button device for pedestrian crosswalk signal system as in claim 1, wherein said remote controlled crosswalk signal system is used in conjunction with existing traffic signal control system.

7. The wireless push button device for pedestrian crosswalk signal system as in claim 1, wherein said first microprocessor is programmed to operate the functions of said remote control and said second microprocessor is programmed to operate the functions of said receiver assembly.

8. The wireless push button device for pedestrian crosswalk signal system as in claim 1, wherein said first microprocessor calculates an angle value of said remote control orientation from a value received from said compass.

9. The wireless push button device for pedestrian crosswalk signal system as in claim 1, wherein an erroneous angle value given by said compass resulting from a tilt of said remote control is corrected by said first microprocessor based on inputs received from said accelerometer.

10. The wireless push button device for pedestrian crosswalk signal system as in claim 1, wherein an angle value of said remote control orientation is transmitted from said remote control to said receiver assembly through said first RF Module.

11. The wireless push button device for pedestrian crosswalk signal system as in claim 1, wherein an angle value of said remote control orientation is transmitted back from said receiver assembly to said remote control through said second RF Module.

12. The wireless push button device for pedestrian crosswalk signal system as in claim 1, wherein said receiver assembly compares the validity of an angle value received from said remote control with stored values of angles assigned by said second microprocessor during installation of said receiver assembly at said traffic signal pole.

13. The wireless push button device for pedestrian crosswalk signal system as in claim 1, wherein said receiver assembly sends random numbers back to said remote control for invalid angle and said first microprocessor does not activate said LED, vibrator and buzzer of said remote control.

14. The wireless push button device for pedestrian crosswalk signal system as in claim 1, wherein said receiver assembly sends encrypted angle value back to said remote control for valid angle and walk signal OFF state and said first microprocessor activates said LED, vibrator and buzzer in flashing mode.

15. The wireless push button device for pedestrian crosswalk signal system as in claim 1, wherein said receiver assembly sends angle value with special code back to said remote control for valid angle and walk signal ON state and said first microprocessor activates said LED, vibrator and buzzer in continuous mode.

16. The wireless push button device for pedestrian crosswalk signal system as in claim 1, wherein a plurality of Bluetooth devices and other wireless devices are used to transmit signals between said remote control and said receiver assembly.

17. The wireless push button device for pedestrian crosswalk signal system as in claim 1, wherein electric power for said receiver assembly is sourced from at least one power line of said existing pedestrian crosswalk signal system.

18. The wireless push button device for pedestrian crosswalk signal system as in claim 1, wherein electric power for said receiver assembly is sourced through said capacitor and any other energy storage device.

19. The wireless push button device for pedestrian crosswalk signal system as in claim 1, wherein said receiver assembly detects said pedestrian crosswalk signal status.

20. The wireless push button device for pedestrian crosswalk signal system as in claim 1, wherein said wireless transmission is a radio frequency transmission in plain form, encrypted form or in coded form.

21. A method of wireless request for registering activation of a desired pedestrian crosswalk signal system on an existing traffic signal pole, said method comprising the steps of:
   triggering of a remote push button pointing a remote control towards the direction in which a user is desiring to cross a street using crosswalk;
   calculating an angle value of a remote control orientation from a value received from a compass by a first microprocessor;
   correcting an erroneous angle given by said compass resulting from a tilt of said remote control by said first microprocessor based on an input received from an accelerometer;
   transmitting said calculated angle value to a receiver assembly through a first RF Module by wireless transmission;

receiving said calculated angle value by a second RF Module of said receiver assembly;

comparing said received angle value with that of stored values by a second microprocessor of said receiver assembly for validity;

determining the validity of said received angle value based on calculations by said second microprocessor;

confirming the validity of said received angle value based on calculations by said second microprocessor;

sending back valid or invalid angle value as a random number, an encrypted angle value or a special code through said second RF Module to said remote control;

comparing said angle value sent and received from and by said remote control by said first microprocessor;

confirming to said user when a request for activation of said desired crosswalk signal system gets registered and as to when it is safe to cross said crosswalk by providing visual, audible and tactile alerts.

22. The method of wireless request for registering activation of a desired pedestrian crosswalk signal system on an existing traffic signal pole as in claim 21, wherein said user is a general pedestrian, a cyclist, a visually impaired pedestrian, a hearing impaired pedestrian or a wheelchair bound person.

23. The method of wireless request for registering activation of a desired pedestrian crosswalk signal system on an existing traffic signal pole as in claim 21, further comprises activating an already existing audible sound system installed at said traffic signal pole to indicate as to when it is safe to cross said street.

24. The method of wireless request for registering activation of a desired pedestrian crosswalk signal system on an existing traffic signal pole as in claim 22, further comprises facilitating a visually impaired pedestrian where there is no audible sound system installed at said traffic signal pole by giving audible and tactile confirmation as to when it is safe to cross said street.

25. The method of wireless request for registering activation of a desired pedestrian crosswalk signal system on an existing traffic signal pole as in claim 22, further comprises facilitating visually impaired pedestrians where there is no provision of pedestrian push button by giving audible and tactile confirmation as to when it is safe to cross the said street.

26. The method of wireless request for registering activation of a desired pedestrian crosswalk signal system on an existing traffic signal pole as in claim 21, wherein electric power for said receiver assembly is sourced from at least one power line of said existing pedestrian crosswalk signal lights.

27. The method of wireless request for registering activation of a desired pedestrian crosswalk signal system on an existing traffic signal pole as in claim 21, wherein electric power for said receiver assembly is sourced through a capacitor and any other energy storage device.

28. The method of wireless request for registering activation of a desired pedestrian crosswalk signal system on an existing traffic signal pole as in claim 21, wherein a plurality of Bluetooth devices or any other wireless devices are used to transmit signals between said remote control and said receiver assembly.

29. The method of wireless request for registering activation of a desired pedestrian crosswalk signal system on an existing traffic signal pole as in claim 21, wherein said wireless transmission is a radio frequency transmission in encrypted form and in coded form.

30. The method of wireless request for registering activation of a desired pedestrian crosswalk signal system on an existing traffic signal pole as in claim 21, wherein said receiver assembly detects said pedestrian crosswalk signal status.

* * * * *